June 10, 1958 G. N. SIMPSON 2,838,290
MATERIAL CONDITIONER
Filed June 11, 1954 4 Sheets-Sheet 2

Inventor
George N. Simpson
by Parker & Carter
Attorneys

June 10, 1958  G. N. SIMPSON  2,838,290
MATERIAL CONDITIONER
Filed June 11, 1954  4 Sheets-Sheet 3

Inventor
George N. Simpson
by Parker & Carter
Attorneys

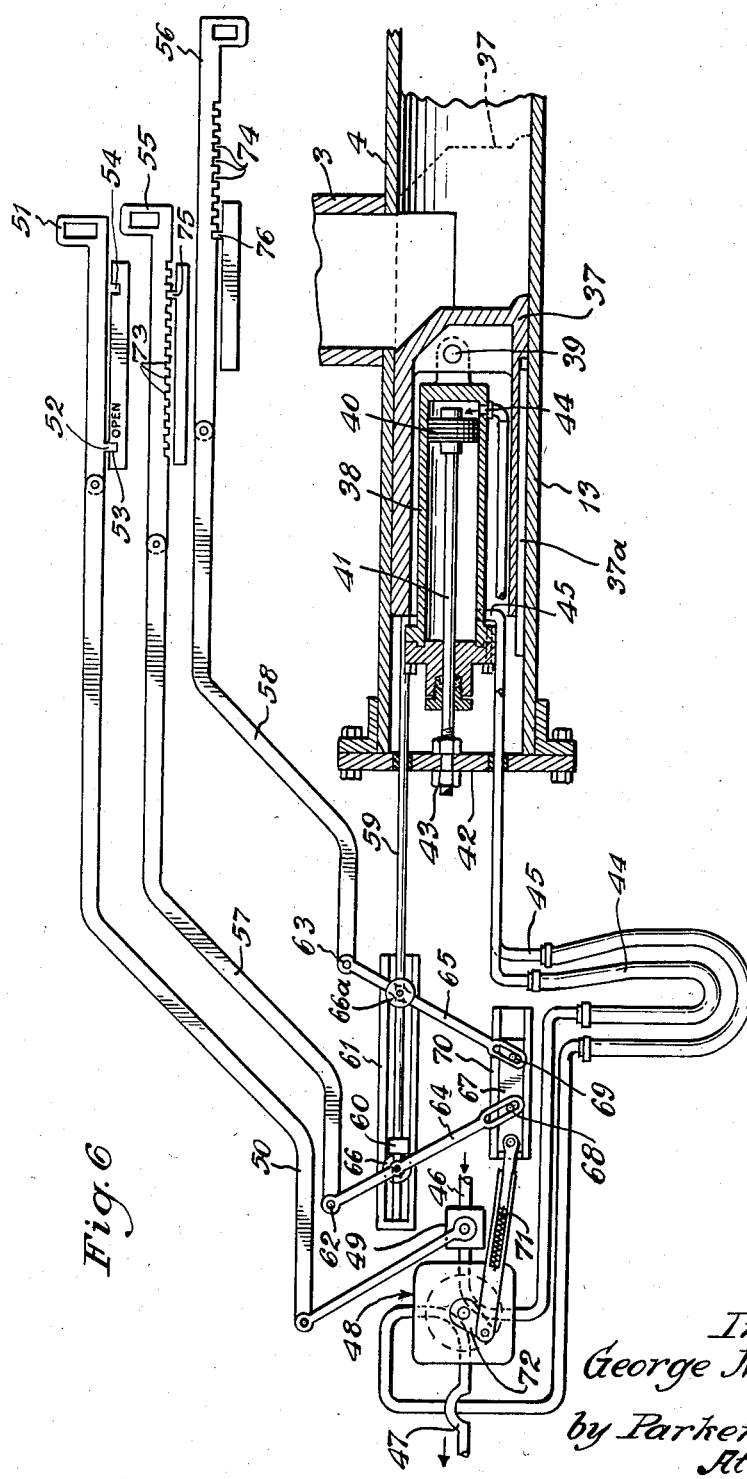

United States Patent Office 2,838,290
Patented June 10, 1958

2,838,290

MATERIAL CONDITIONER

George N. Simpson, Chicago, Ill.

Application June 11, 1954, Serial No. 436,205

11 Claims. (Cl. 259—3)

The present invention is directed to a new and improved material conditioning assembly. Specifically, this present invention is directed to a new and improved apparatus for conveying and treating granular materials or dust, in such a way that the conveying process is expedited and controlled with a lessening of the difficulties heretofore encountered in handling this form of material and wear at packing glands and other moving parts is reduced.

Some of the more serious problems in the conveying of granular material arise from the presence of fine dust and the tendency of this material to "bridge," which clogs the conveying mechanism. It has heretofore been general practice to associate a drum with a material feeding hopper, the hopper discharging into the drum. The material in the drum is treated with water which tends to eliminate the release of dust. These drums are usually rotated and are provided with a water spray for the material within the drum.

Several difficulties are encountered in this form of apparatus. If the material is not properly and completely mixed with water, dust may continue in the mixture of the material and the water may form a slurry which makes the handling process difficult. The material passing from the hopper to the drum, whether wet or dry, may tend to "bridge," thus restricting the feed of the material to the drum which in turn may result in an over-supply of moisture to the material in the drum. Furthermore, it has been difficult to maintain a dust-tight packing and bearing for the inlet end of the drum. Previous constructions have used a packing gland the full diameter of the drum. Dust which collects in the bottom of the drum worked into the packing and since the dust is usually very abrasive there was rapid wear of the packing. Slight movement between the drum and the inlet equipment causes "breathing" which draws dust into this packing gland.

The presence of dust in the packing gland greatly increases the friction on the gland overloading the driving mechanism and causing excessive wear and injury.

The present invention has for its major purpose the lessening of these difficulties encountered in the previous practice.

One object of the present invention is the formation of a feeding assembly for a material feeding drum wherein the feed rate from the hopper to the drum may be closely controlled.

Another object of the present invention is the provision of a feeding assembly which substantially eliminates the tendency of the granular material to "bridge" or to clog the passageway leading from the hopper to the treating drum.

Another object of the present invention is the provision of a packing gland located entirely above the normal dust level in the drum.

Another object of the present invention is the provision of a new and improved supporting assembly for the inlet end of the material treating drum.

Another object of the present invention is the provision of improved control means for the material feeding and feed rate controlling mechanism.

Another object of the present invention is the provision of an improved and controlled delivery of dust on the bottom of the material treating drum.

Other objects will appear from time to time in the course of the ensuing specification and claims.

Referring generally now to the drawings:

Figure 6 is a detailed view of the feeding assembly and the control therefor.

Figure 1:
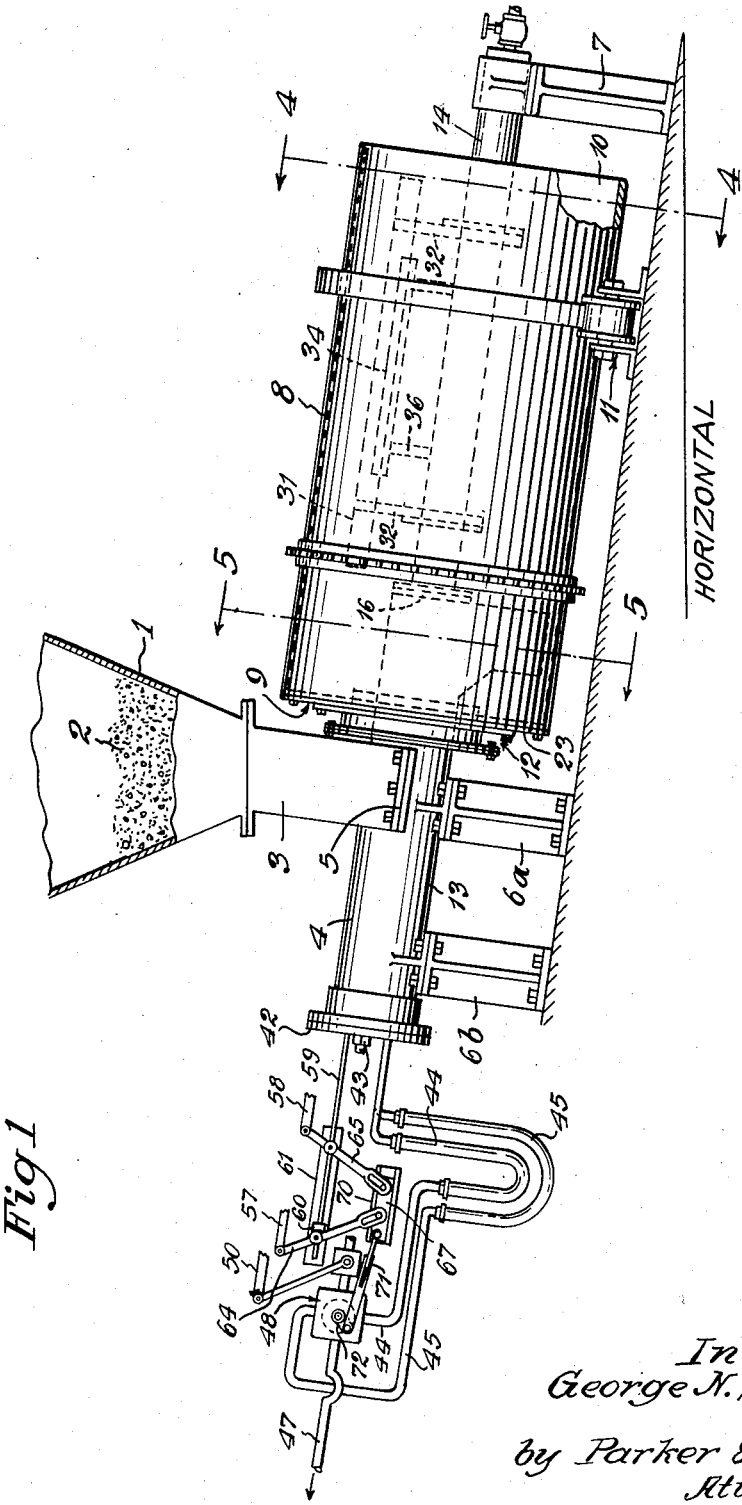
Figure 1 is an assembly view in side elevation of the present invention.

Referring specifically now to the drawings wherein like characters designate like elements throughout and in the first instance to Figure 1, 1 represents any suitable hopper or chute adapted to contain granular or dusty material 2 therein. I employ the term "hopper" or "chute" to refer to any suitable means adapted to convey granular material. The hopper 1 or chute has a discharge portion 3 at the lower end thereof. The discharge portion 3 is formed integrally with a stationary, hollow shaft 4 as at 5. It may be bolted thereto.

The shaft 4 is elongated and is fixed to any suitable supports 6a and 6b and 7 in such a way that its axis is inclined to the horizontal. It is inclined on the order of 6 to 1, or as required to produce proper travel of material through the drum.

8 designates a material treating drum having an inlet end portion 9 disposed adjacent the discharge portion of the hopper and an open discharge end 10 at the other end thereof. The drum 8 is supported adjacent its discharge end 10 by means of any suitable bearing assembly 11. It is supported at its inlet end by a bearing and packing assembly 12. The drum 8 is so mounted that its axis is generally coincident with the axis of the shaft 4.

Shaft 4 includes a generally enlarged hollow portion 13, the interior of which is in communication with the hopper 1 through the discharge portion 3 of the hopper. To shaft 4 is attached a second "water tight" hollow portion 14 joined to the first portion, as at 15, by any suitable connections which carries water to sprays and supports a scraper bar. For example, each of the portions 13 and 14 may be closed by end plates 16 and 17, respectively, which are joined together in abutting relation.

The shaft portion 13 includes a depending discharge outlet which is formed in the interior of the drum 8 and extends to a point spaced a small distance away from the lower portion of the drum, as at 18. This discharge portion is preferably formed from plates joined to the shaft portion 13. The discharge conduit formed by these plates has one side portion as at 19 (Figure 5) spaced a greater distance from the interior of the drum than the opposite plate 20, thereby forming a passageway between the conduit and the interior of the drum of a larger area on one side than the other. Adjustment of the opening between portion 19 and the drum regulates the thickness of material deposited in drum.

Figure 4:
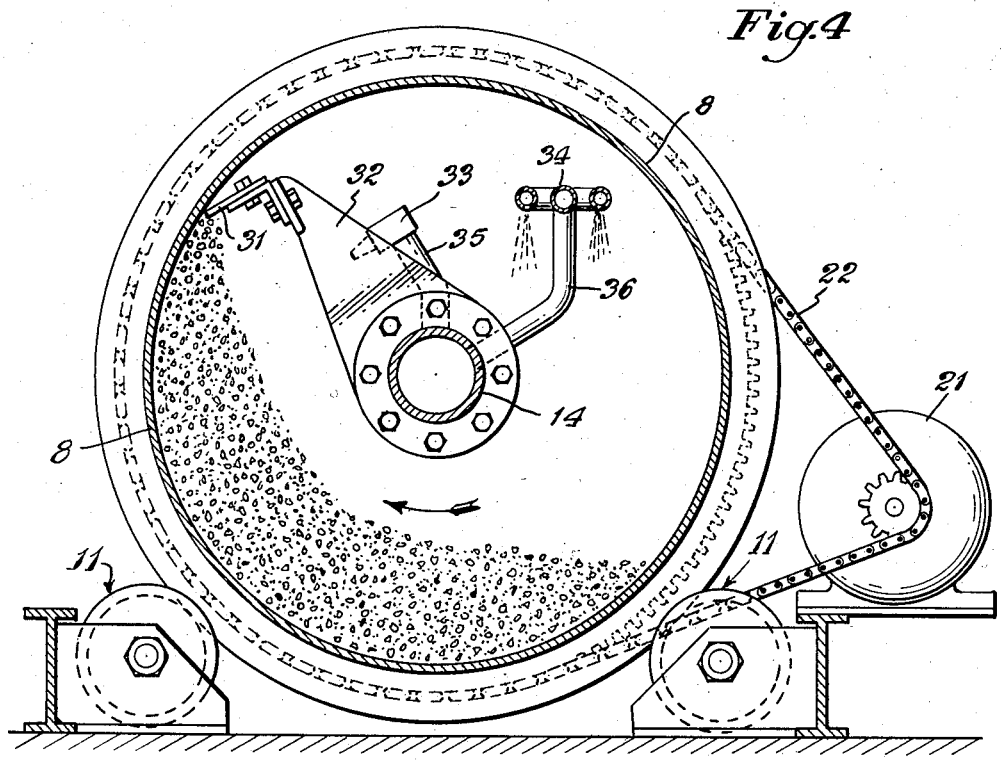
Figure 4 is a sectional view of the drum shown in Figure 1 taken along the section line 4—4 of Figure 1.
Figure 5:
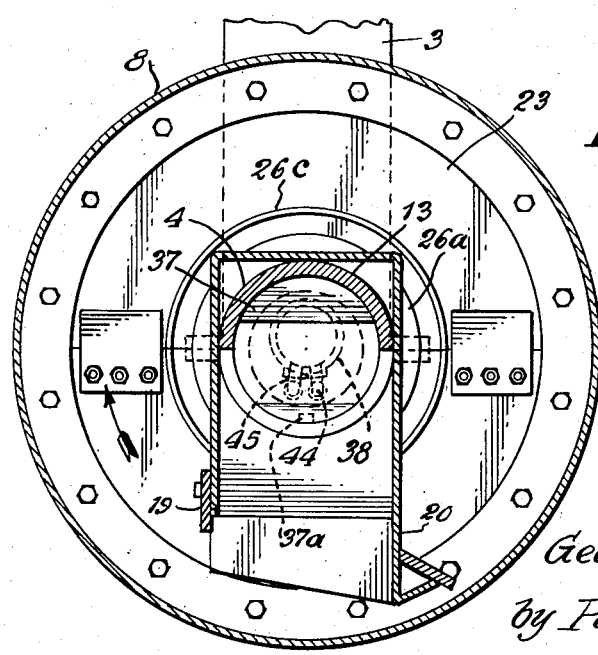
Figure 5 is a sectional view of the drum shown in Figure 1 taken along the section line 5—5 of Figure 1.

I employ any suitable means such as a motor 21 and chain drive 22 for rotating the drum, as will be seen best in Figures 1 and 4. The chain driven by the motor may, for example, extend around the periphery of the drum and engage a sprocket formed on the exterior of the drum. The motor 21 is adapted to drive the drum in the direction of the arrows shown in Figures 4 and 5 so that material passing from the discharge portion 3 of the hopper, through the shaft portion 13 and deposited on the lower portion of the drum will be carried clockwise, as shown in Figure 5, or in the direction of the plate 19.

The inlet end of the drum is provided with an end wall 23 which is apertured as at 24 for the passage of the shaft portion 13 therethrough. 25 designates any suitable packing material retained by a clamp 26 between plate 23 and flange 26a extending around the shaft portion 13 and bolted to the shaft 13. The packing 25 is thus interposed between the drum 8 and the shaft and serves to prevent the egress of dust or similar particles from the drum. 26c is a guard extending around the packing gland. It is welded to the wall 23.

The inlet end of the drum itself is supported on the shaft portion 13. An outer bearing race 26d is joined to the end wall 23 and has an inner surface 27 in contact with a series of rollers 28. The rollers 28 directly engage the shaft portion 13. The shaft portion 13 serves not only as a conduit for the conveyance of the granular material but also forms an inner race for the bearing assembly supporting the inlet end of the drum. A plate 29 is joined to the member 26d as by means of any suitable bolts 30 and serves to retain the roller elements 28 between the plate and the outer surface of the end wall 23 of the drum.

Figure 2:
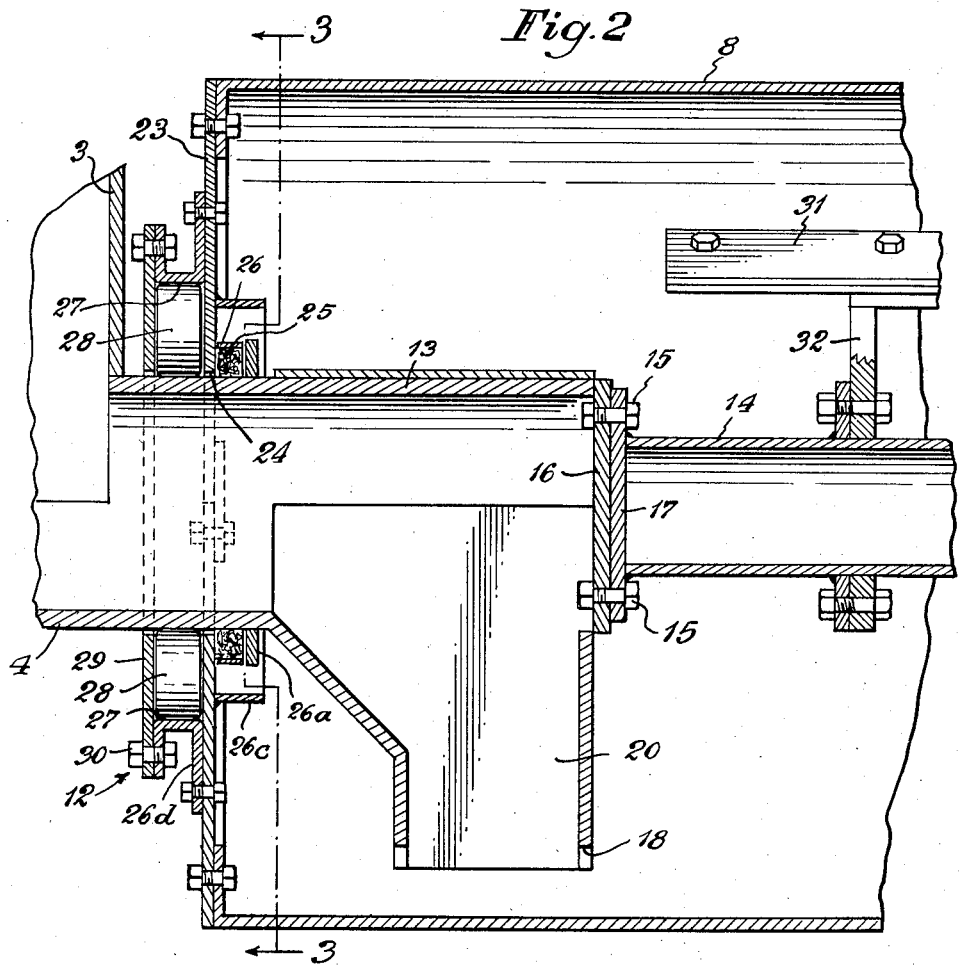
Figure 2 is an enlarged detailed view in section of the bearing and packing means for dust control and delivery on the bottom of the inlet end of the drum.
Figure 3:
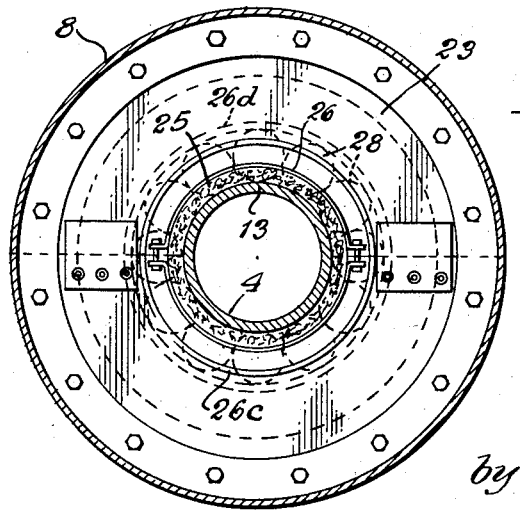
Figure 3 is a sectional view of the device shown in Figure 2 taken along the section line 3—3 of Figure 2.

As will be noted in Figure 2, the discharge outlet from the shaft portion 13 is spaced from the packing 25 and since the drum is inclined, rotation of the drum results in a working of the material carried by the drum toward the discharge end of the drum and away from the packing 25.

I employ a scraper element 31, which is joined to the shaft portion 14 as by means of flanges and plates 32, for scraping material from the inner wall of the drum. Preferably the scraper element extends through a substantial portion of the length of the drum and is positioned substantially above the axis of the drum. The scraper 31 extends to a point closely adjacent the inner wall of the drum so as to effectively prevent an excess of the granular material from sticking to the drum.

Designated generally at 33 and 34 are a series of nozzles supplied with water through the interior of the shaft portion 14 and through conduits 35 and 36. The water supplied through these nozzles is continuously sprayed on the surface of the material. As the material progresses toward the discharge end of the drum the nozzles are positioned in such a manner that the upper surface of the material being conveyed through the drum will be wetted to the proper degree, and as the drum rotates the material in the drum will rise to a point indicated generally by the position of the scraper 31, and then the surface material will fall back and roll down the slope towards the lower portion of the drum. If the diameter of the drum is about 4 feet and if the drum is positioned on a slope of about 2" vertical to 12" horizontally, as shown generally in Figure 1, the material within the drum will move about 5 inches toward the discharge end of the drum during each revolution of the drum.

In the course of this conveying movement the entire material within the drum will be wetted to the proper degree. The tumbling action of the drum and scraper tends to constantly change the relative position of the material in the drum. As the material at the lower surface of the drum rises and falls back to the center of the drum it will tend to be positioned on the upper surface of the mass of material in the lower portion of the drum, exposing the underlying dry material to the water sprays.

I employ a ram 37 as one method for controlling the rate of flow of material from the hopper 1 to the drum 8 and for eliminating the tendency of the material in the bin or hopper 1 to "bridge" and clog the hopper. The ram 37 is slidably mounted in the shaft portion 13 and is adapted for movement between the position shown in Figure 6 and the position shown in dotted outline in that same figure. The ram 37 may be held against rotation by a key 37a. The ram 37 is interconnected with the cylinder 38 of a hydraulic motor assembly as at 39. The piston 40 of this motor has its piston rod 41 fixed to an end wall 42 of the shaft portion 13 as at 43. Controlling conduits 44 and 45 communicate with the cylinder 38 on opposite sides of the piston 40. The conduits 44 and 45 are adapted for selective communication with a hydraulic fluid under pressure from a reservoir to the conduit 46, and any suitable means may be provided for conducting and controlling the flow of fluid from the conduit. The details of the pump and reservoir assembly do not in themselves form part of the present invention and for this reason I have not shown them in the drawings.

49 represents a control valve interposed between the pump and the valve assembly 48. This valve is adapted to be moved between an open and a closed position, and is provided with a control linkage 50. The control linkage 50 includes a manually actuable setting lever 51. The setting lever 51 is adapted for movement between a first position as shown in Figure 6 where the valve is open, and a second position where the valve is closed. The member 51 carries a detent 52 adapted for selective reception within spaced recesses 53 and 54. When the detent 52 is engaged with the recess 53 the valve is in the open position, as shown in Figure 6. By elevating the member 51 so as to free the detent 52 from the recess 53 the member 51 may be moved to the right, as shown in Figure 6 and the detent 52 may be engaged with the recess 54 to hold the valve in its closed position and thus prevent communication between the pump and the fluid motor.

I also include a linkage for controlling the stroke of the gate 37. A pair of manually actuable members 55 and 56 control the stroke of the gate through link 57 and 58 connected with these members.

A rod 59 is fixed to the ram 37 and movable with the ram. Rod 59 carries a member 60 which slides along a guideway 61. The position of the member 60 with respect to the slideway thus corresponds to the position of the ram 37. Each of the links 57 and 58 are pivotally connected as at 62 and 63 respectively with another link 64 and 65, respectively. Each of the links 64 and 65 has a roller 66 and 66a, respectively, mounted for movement within the guideway 61. Each of the links 64 and 65 are connected at their lower end portions with a slide 67 by means of pin and slot lost-motion connections indicated generally at 68 and 69. The slide 67 is mounted in a guide 70 and is interconnected through a spring link 71 with a control lever 72 for the valve 48. A notch on valve lever 72 engages a dog in both the open and closed position. When lever notch is forced beyond dog spring will complete the lever movement. As shown, the conduit 44 is in communication with the pressure conduit 46 when the slide 67 is at its left-hand position, within the guide, as shown. Movement of the slide 67 to the right rotates the valve lever 72 in a counter-clockwise direction and establishes communication between the pressure conduit 46 and the conduit 45, and also establishes communication between the discharge conduit 47 and the conduit 44, thus reversing the flow of fluid to the cylinder 38 and reversing the movement of the cylinder 38 and ram 37. The same result can of course be obtained by electrical or pneumatic control means.

With the elements in their position, as shown in Figure 6, the members 55 and 56 are set for a comparatively large stroke for the ram 37. It should be noted that in this position of the elements the valve 48 is set to admit fluid through the conduit 44. The cylinder 38 and ram 37 will move to the right until the abutment 60 strikes the member 67 and moves the link 65 counter-clockwise around its pivot 63. This counter-clockwise movement will pull the slide 67 to the right and rotate the valve plug in the valve body 48 to establish communication between the pressure line 46 and the conduit 45 and the discharge line 47 and the conduit 44, thus reversing the valve and direction of movement of the ram 37. The ram 37 will then move to the left until the abutment 60 strikes the member 66 and rotates the lever 64 in a clockwise direction about its pivot 62. This movement of the lever 64 will move the slide 67 to the left and thus reverse the valve 48.

Each of the members 55 and 56 have a plurality of spaced recesses 73 and 74 respectively. These recesses are formed along the length of the members 55 and 56. The recesses 73 are adapted for selective engagement with the locking projection 75. The recesses 74 are adapted for selective engagement with the locking projection 76. When the recesses are engaged by their associated locking projections the members 55 and 56 will be held in a fixed position. By disengaging the locking projection 75 and moving the actuating member 55 toward the right the pivot point 62 will also be moved towards the right and the effective stroke of the ram 37 to the left will be moved nearer to the inlet end of the drum.

Similarly, by disengaging the locking projection 76 and moving the actuating member 56 to the left, as seen in Figure 6, the stroke of the ram 37 may also be shortened due to the movement of the pivot 63 to the left and the consequent shortening of the travel of the abutment 60 between the members 66 and 67.

Thus, by adjustment of the actuating members 55 and 56 I can effectively control the length of the stroke of the ram 37 and I can adjust either limit of movement of the ram 37 to the left or to the right. At any one of the positions of the ram 37 I may engage the locking projection 52 with the recess 54 and thus close the valve 49 and hold the ram stationary in any desired position.

With this form of ram control assembly the ram may be set at any desired position and control the effective discharge area from the discharge portion 3 of the hopper 1. If the material moves too slowly the ram may be moved to the left to increase the opening or discharge area. If the material flows too fast the ram may be moved to the right to decrease the area of discharge. If the material tends to arch when flowing through the discharge portion 3, the controls may be set so that the ram 37 will oscillate back and forth and subject the material to an agitating action from below. The oscillating stroke may be closely controlled so that the size of the fixed area of discharge between the discharge portion 3 and shaft portion 13 may be controlled. Furthermore, if the material in the shaft portion 13 does not move freely into the drum the stroke of the ram may be increased to force the material into the drum.

The fine degree of control afforded by this assembly lessens to a large extent over-feeding between the hopper 1 and the drum 8, which will make a dusty discharge or underfeeding which will make a sloppy discharge.

If the operator desires to stop the flow of the material altogether he may move the ram to its extreme right-hand position, as seen in Figure 6, and thus stop the flow of material altogether.

Whereas I have shown and described this form of control with the use of hydraulic fluid under pressure, I wish it to be understood that the same controlled movements of the ram 37 may be obtained with the use of compressed air instead of hydraulic fluid and if desired, suitable electrical control means such as solenoid actuated valve and electric push buttons or drum controls may be employed in lieu of the valve 48 and control link 71, and valve 49 and linkage 50.

After the material is treated with moisture in the drum 8 it discharges through the open end 10 of the drum and may be taken from this discharge and by any suitable vehicles or the like to any suitable or desired place of deposit.

Whereas I have shown and described an operative form of my invention, I wish it to be understood that there are modifications to the invention which will fall within the scope and spirit of the invention and which will be apparent to those skilled in the art. The scope of the invention should be limited only by the scope of the hereinafter appended claims.

I claim:

1. A material conditioning assembly including a hopper and a material treating drum in communication therewith through a passageway leading from the hopper to the drum, whereby material may flow from the hopper to the drum, a ram movably mounted in said passageway, said ram, upon movement thereof, being operative to vary the effective flow area between said hopper and said drum to thereby control the amount of material flowing from said hopper to said drum, and means independent of the material in the hopper for holding said ram at a selected position between opposite limits of movement within said passageway.

2. A material conditioning assembly including a hopper and a material treating drum in communication therewith through a passageway leading from the hopper to the drum, whereby material may flow from the hopper to the drum, a ram movably mounted in said passageway, said ram, upon movement thereof, being operative to vary the effective flow area between said hopper and said drum to thereby control the amount of material flowing from said hopper to said drum, power means operable independently of the level of material in the hopper for reciprocating said ram in regular cycles, and means for holding said ram at a selected position between opposite limits of movement thereof within said passageway to thereby regulate the effective area of said passageway for material passing from said hopper to said drum.

3. A material conditioning assembly including a hopper and a material treating drum in communication therewith through a passageway leading from the hopper to the drum, whereby material may flow from the hopper to the drum, a ram movably mounted in said passageway, said ram, upon movement thereof, being operative to vary the effective flow area between said hopper and said drum to thereby control the amount of material flowing from said hopper to said drum, power means for reciprocating said ram, means for varying the effective stroke of said ram, and means for locking said ram at a selected position within said passageway.

4. A material conditioning assembly including a hopper and a material treating drum in communication therewith through a passageway leading from the hopper to the drum, whereby material may flow from the hopper to the drum, a ram movably mounted in said passageway, said ram, upon movement thereof, being operative to vary the effective flow area between said hopper and said drum to thereby control the amount of material flowing from said hopper to said drum, power means for reciprocating said ram, and a control assembly for said power means including an automatic reversing mechanism for said power means and a manually actuable linkage formed and adapted to selectively vary the stroke of said ram.

5. The structure of claim 4 wherein said linkage includes a variably positionable member responsive to a predetermined movement of said ram for actuating said reversing mechanism.

6. A material conditioning assembly including a hopper adapted for the reception of granular material, said hopper having a discharge portion at the lower end thereof in communication with a hollow drum supporting shaft having an inclined material treating and moistening drum mounted for rotation about the axis of said shaft, said drum having an inlet end portion adjacent the discharge portion of said hopper, said shaft having a discharge outlet positioned within said drum adjacent said inlet end, means for rotating said drum in a predetermined direction, a material deflecting scraper member supported in the upper portion of the drum adjacent the inner wall of said drum whereby material moved upwardly during rotation of the drum is deflected downwardly prior to its reaching the uppermost portion of the drum, the inclination of the drum being effective to move the material towards the discharge end of the drum during the fall of material toward the lower portion of said drum.

7. A material conditioning assembly including a hopper adapted to contain granular material therein, said hopper having a discharge outlet in the lower end portion thereof, said discharge outlet being in communication with a hollow drum supporting shaft thereby allowing flow of granular material from said hopper to said shaft, a material treating drum mounted for rotation about the axis of said shaft and having an inlet end portion disposed adjacent the discharge outlet, the inlet end of said drum being apertured for the passage of said shaft therethrough, said shaft having a discharge outlet in the lower portion of said drum, the drum having an inclined axis whereby material flowing from said hopper may pass to the interior of said drum through the action of gravity, and supporting means for the inlet end of said drum including an outer bearing race fixed to the inlet end of said drum and surrounding said shaft and a series of roller elements positioned between said outer race and said shaft whereby said shaft forms the inner race for said roller elements, and packing means carried by the inlet end of said drum between said inlet end and said shaft, said roller elements and packing means being enclosed to prevent the wearing effect of the material thereon.

8. A material conditioning assembly including a hopper having a discharge outlet at the lower end thereof, a conveying drum mounted for rotation about an axis inclined to the horizontal, said drum having one end thereof disposed adjacent said discharge outlet; a conveying shaft fixed with respect to said hopper and extending through said drum, said shaft being in communication with said discharge outlet and having a discharge spout disposed within said drum at the inlet end portion of said drum, means for rotating said drum and a scraper member mounted on said shaft and extending close to the inner surface of said drum whereby material carried upwardly during rotation of said drum is forced downwardly towards said discharge spout, the inlet end of the drum being supported on said shaft.

9. A material conditioning assembly including a hopper, a material conditioning drum in communication therewith, there being a passageway leading from the hopper to the drum and remote controlled flow regulating means adapted to control flow through said passage, means operable independently of the level of material in the hopper for selectively adjusting the flow regulating means to open, to close and to vary the opening available for flow through the passage, said means being adapted to reciprocate said flow regulating means between open and closed position, and manual and automatic means for controlling the position and operation of the control means.

10. In combination, a fixed inlet duct, a drum rotatably mounted on the duct, a gland interposed between the drum and the duct, the drum being supported at one end entirely upon such duct, the gland and drum support being adjacent the center and far removed from the periphery of the drum whereby the duct and the drum are maintained in permanent alignment and the gland is located above the layer of any material supported on the underside of the drum, said gland being enclosed to restrict the passage of dust thereto.

11. In combination, a rotatable drum having a centrally apertured feed end, a hollow shaft extending inwardly through the aperture and terminating intermediate the ends of the drum, an anti-friction bearing interposed between the drum and the shaft and adapted to maintain the axes of drum and shaft in concentricity, a packing gland encircling and in contact with the shaft and interposed between the anti-friction bearing and the interior of the drum, the inner diameter of the gland and the anti-friction bearing being substantially the same, a downwardly open discharge chute carried by the shaft, the chute having a discharge mouth directed toward the lower periphery of the drum and located at a point between the outer lower periphery of the drum and the packing gland.

References Cited in the file of this patent
UNITED STATES PATENTS

| | | |
|---|---|---|
| 70,742 | Pitcher | Nov. 12, 1867 |
| 615,519 | Barr | Dec. 6, 1898 |
| 1,450,561 | Parker | Apr. 3, 1923 |
| 2,420,217 | Allen | May 6, 1947 |
| 2,538,947 | Ragatz | Jan. 23, 1951 |